(12) United States Patent
Song et al.

(10) Patent No.: US 10,001,779 B1
(45) Date of Patent: Jun. 19, 2018

(54) AUTOMATIC GUIDED VEHICLE

(71) Applicant: HON HAI PRECISION INDUSTRY CO., LTD., New Taipei (TW)

(72) Inventors: Hai-Jian Song, Shandong (CN); Da-Yuan Wang, Shandong (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days. days.

(21) Appl. No.: 15/649,735

(22) Filed: Jul. 14, 2017

(30) Foreign Application Priority Data

Jun. 14, 2017 (CN) .......................... 2017 1 0448510

(51) Int. Cl.
G05D 1/02 (2006.01)

(52) U.S. Cl.
CPC ....... G05D 1/0212 (2013.01); *G05D 2201/02* (2013.01); *G05D 2201/0216* (2013.01)

(58) Field of Classification Search
CPC .. G05D 1/0238; G05D 1/0255; G05D 1/0242; G05D 1/0265
See application file for complete search history.

(56) References Cited

U.S. PATENT DOCUMENTS

| | | | | |
|---|---|---|---|---|
| 2,247,007 A * | 6/1941 | Arndt | ...................... | E02F 3/765 172/793 |
| 4,044,853 A * | 8/1977 | Melke | .................. | G05D 1/0265 180/167 |
| 4,345,662 A * | 8/1982 | Deplante | ................... | B60T 7/18 180/168 |
| 4,530,056 A * | 7/1985 | MacKinnon | ......... | G05D 1/0238 180/168 |
| 5,023,790 A * | 6/1991 | Luke, Jr. | .......... | G05B 19/41865 180/168 |
| 5,163,001 A * | 11/1992 | Luke, Jr. | .......... | G05B 19/41895 180/169 |
| 5,646,494 A * | 7/1997 | Han | ..................... | A47L 11/4011 318/587 |
| 5,988,306 A * | 11/1999 | Ooishi | ..................... | B62D 1/28 180/168 |
| 8,447,448 B2 * | 5/2013 | Scheuerman | ........ | G05D 1/0242 180/168 |
| 2016/0194023 A1 * | 7/2016 | Johnson | ................... | B62D 1/20 180/168 |

\* cited by examiner

*Primary Examiner* — Hau V Phan
(74) *Attorney, Agent, or Firm* — ScienBiziP, P.C.

(57) ABSTRACT

An automatic guided vehicle comprises a vehicle body, a swerving portion, a controlling portion and a driving portion. The vehicle body comprises two front wheels, a front wheel shaft connecting between the two front wheels, two back wheels and a back wheel shaft connecting between the two back wheels. The swerving portion comprises a front swerving shaft, a front gear, a back swerving shaft, a first back gear, a swerving driver and a conveying belt. The controlling portion drives the swerving driver to rotate. The driving portion is installed to the back wheel shaft and driving the back wheel shaft to rotate.

15 Claims, 2 Drawing Sheets

AUTOMATIC GUIDED VEHICLE

FIELD

The subject matter herein generally relates to an automatic guided vehicle.

BACKGROUND

An automatic guided vehicle can be used to carry merchandise in a warehouse. Flexible steering for the automatic guided vehicle is necessary.

BRIEF DESCRIPTION OF THE DRAWINGS

Implementations of the present technology will now be described, by way of example only, with reference to the attached figures.

DETAILED DESCRIPTION

Figure 1:
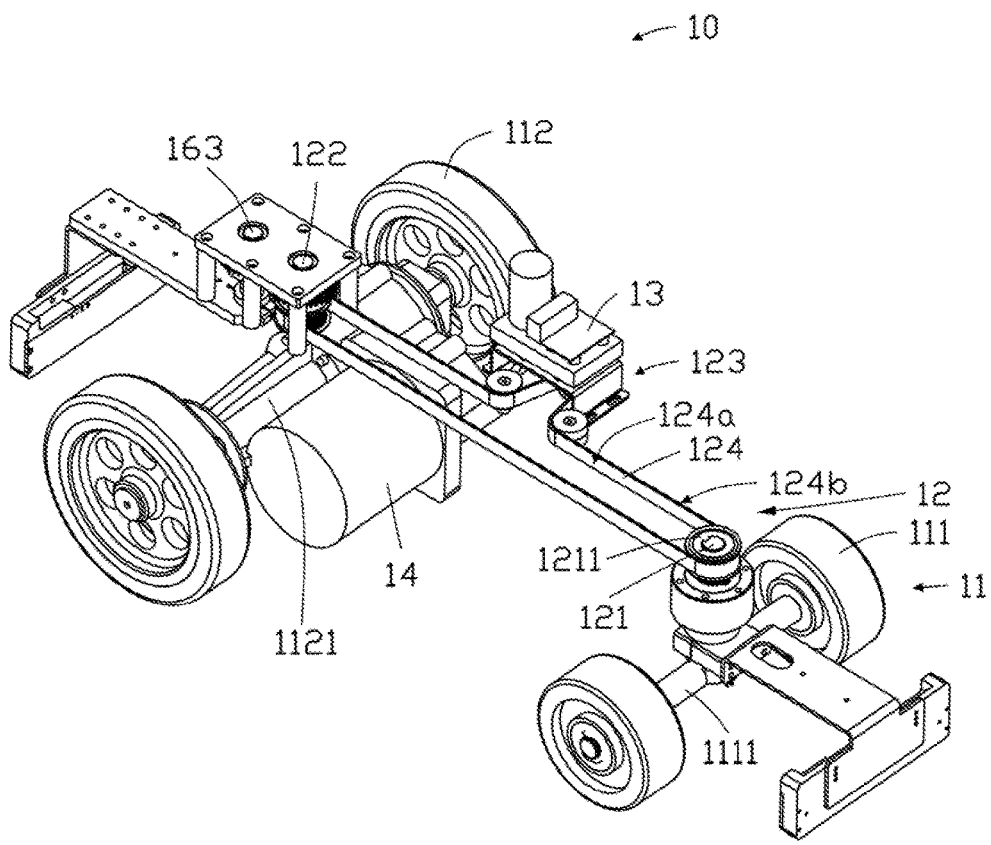
FIG. 1 is a diagram of an automatic guided vehicle in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

An automatic guided vehicle comprising:
a vehicle body comprising:
two front wheels;
a front wheel shaft connecting between the two front wheels;
two back wheels; and
a back wheel shaft connecting between the two back wheels;
a swerving portion comprising:
a front swerving shaft being installed at a center of the front wheel shaft, and a center axis of the front swerving shaft being perpendicular to the front wheel shaft, a front gear being installed and coupled to the front swerving shaft;
a back swerving shaft being installed at a center of the back wheel shaft, a center axis of the back swerving shaft being perpendicular to the back wheel shaft, a first back gear being installed and coupled to the back swerving shaft;
a swerving driver comprising a driving shaft, a driving gear being installed and entangling to the driving shaft; and
a conveying belt being installed and entangling to the front gear, the first back gear and the driving gear, and the front gear, the first back gear and the driving gear abutting an inside surface of the conveying belt;
a controlling portion driving the driving gear to rotate; and
a driving portion being installed to the back wheel shaft and driving the back wheel shaft to rotate.

The center axis of the front swerving shaft, the center axis of the back swerving shaft, and a center axis of the driving shaft are parallel to each other.

The front gear, the first back gear and the driving gear are placed in one horizontal plane.

A triangle is defined by three lines among the front gear, the first back gear and the driving gear, the front gear, the first back gear and the driving gear are placed in three corners of the triangle.

The swerving portion further comprises two driven shafts and two driven gears being installed and coupled to the two driven shafts respectively.

The two driven gear abut an outside surface of the conveying belt.

The two driven gears are placed in the triangle defined by three lines among the front gear, the first back gear and the driving gear.

One driven gear is placed in one side of the driving gear near the front gear, and another driven gear is placed in another side of the driving gear near the first back gear.

The automatic guided vehicle further comprises a front guiding portion, the front guiding portion comprises a front supporter and a front inductor, one end of the front supporter connects the front swerving shaft, and another end of the front supporter connects the front inductor.

A shaft sleeve is installed and coupled to the front swerving shaft, the front supporter connects the shaft sleeve.

The shaft sleeve is placed under the front gear or on the front gear.

The automatic guided vehicle further comprises a back guiding portion, wherein the back guiding portion comprises a back supporter and a back inductor, one end of the back supporter connects the back swerving shaft, and another end of the back supporter connects the back inductor.

A second back gear is installed and coupled to the back swerving shaft.

The second back gear is placed on the first back gear or under the first back gear.

The back guiding portion further comprises a guiding shaft and a guiding gear, the guiding gear is installed and coupled to the guiding shaft, the back supporter connects the guiding shaft, the guiding gear engages with the second back gear.

Figure 2:
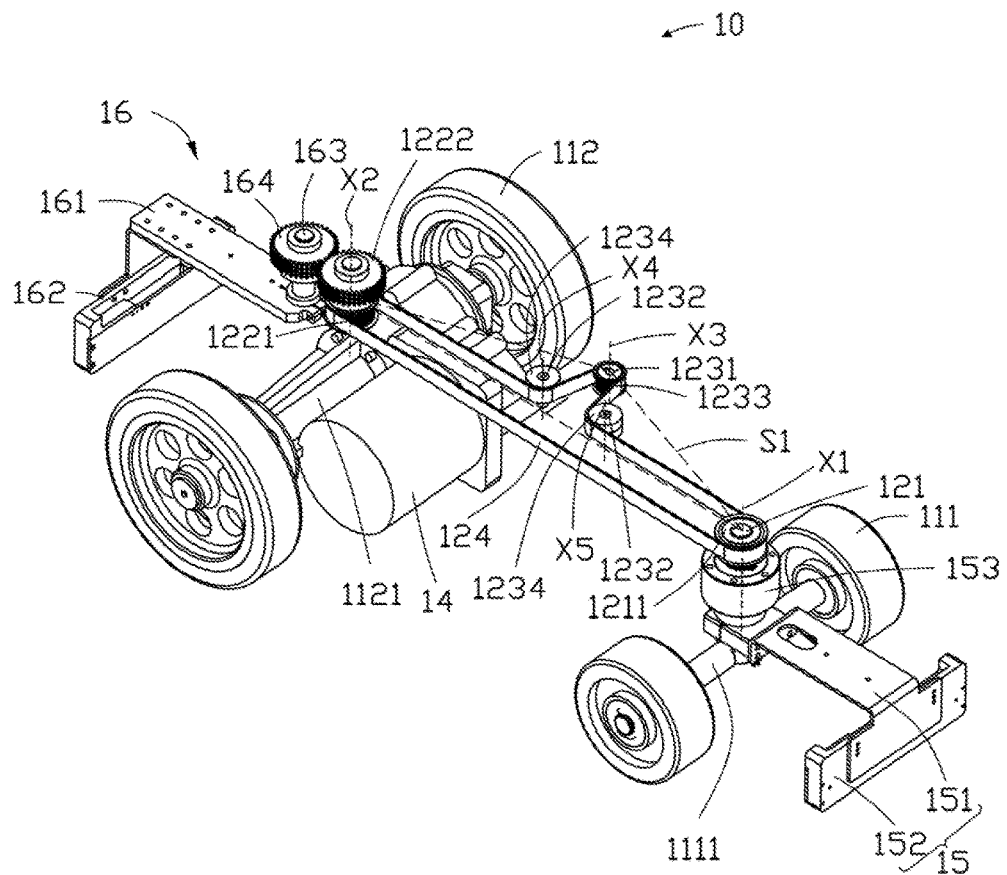
FIG. 2 is a diagram of a part of an automatic guided vehicle of FIG. 1.

Referring to FIGS. 1-2, an automatic guided vehicle 10 is provided. The automatic guided vehicle 10 comprises a vehicle body 11, a swerving portion 12, a controlling portion 13, and a driving portion 14.

The vehicle body 11 comprises two front wheels 111 and two back wheels 112. The vehicle body 11 can further comprise a chassis (not explicitly shown) or a supporting structure (not explicitly shown). A front wheel shaft 1111 connects between the two front wheels 111. A back wheel shaft 1121 connects between the two back wheels 112. In this embodiment, peripheries of the two front wheels 111 and the two back wheels 112 can be made of rubber.

The driving portion 14 is installed to the back wheel shaft 1121. The driving portion 14 drives the back wheel shaft 1121 to rotate, and the back wheels 112 to rotate.

The swerving portion 12 comprises a front swerving shaft 121, a back swerving shaft 122, a swerving driver 123, and a conveying belt 124.

The front swerving shaft 121 is installed at a center of the front wheel shaft 1111. A center axis X1 of the front swerving shaft 121 is perpendicular to the front wheel shaft 1111. A front gear 1211 is installed and coupled to the front swerving shaft 121.

The back swerving shaft 122 is installed at a center of the back wheel shaft 1121. A center axis X2 of the back swerving shaft 122 is perpendicular to the back wheel shaft 1121. A first back gear 1221 is installed and coupled to the back swerving shaft 122.

The swerving driver 123 comprises a driving shaft 1231 and two driven shafts 1232. A driving gear 1233 is installed and coupled to the driving shaft 1231. Two driven gears 1234 are installed and coupled to the two driven shafts 1232 respectively.

The center axis X1 of the front swerving shaft 121, the center axis X2 of the back swerving shaft 122, a center axis X3 of the driving shaft 1231, and two center axes X4, X5 of the two driven shafts 1232 are parallel to each other. The front gear 1211, the first back gear 1221 and the driving gear 1233 are placed in one horizontal plane. A triangle S1 is defined by three lines among the front gear 1211, the first back gear 1221 and the driving gear 1233. The front gear 1211, the first back gear 1221 and the driving gear 1233 are placed in three corners of the triangle S1.

The conveying belt 124 is installed and coupled to the front gear 1211, the first back gear 1221 and the driving gear 1233. The front gear 1211, the first back gear 1221 and the driving gear 1233 abut an inside surface 124a of the conveying belt 124. The two driven gear 1234 abut an outside surface 124b of the conveying belt 124. The two driven gears 1234 are placed in the triangle S1 defined by three lines among the front gear 1211, the first back gear 1221 and the driving gear 1233. One driven gear 1234 is placed in one side of the driving gear 1233 near the front gear 1211, and another driven gear 1234 is placed in another side of the driving gear 1233 near the first back gear 1221.

The controlling portion 13 drives the driving gear 1233 to rotate, and lead the front gear 1211, the first back gear 1221, and the two driven gear 1234 to rotate. The front gear 1211 drives the front swerving shaft 121 to rotate, and leads the front wheel shaft 1111 to swerve, and then leads the front wheels 111 to change direction. The first back gear 1221 drives the back swerving shaft 122 to rotate, and leads the back wheel shaft 1121 to swerve, and then leads the back wheels 112 to change direction.

The automatic guided vehicle 10 can further comprise a front guiding portion 15. The front guiding portion 15 comprises a front supporter 151 and a front inductor 152. One end of the front supporter 151 connects to the front swerving shaft 121, and another end of the front supporter 151 connects to the front inductor 152. In this embodiment, a shaft sleeve 153 is installed and coupled to the front swerving shaft 121. The shaft sleeve 153 is placed under the front gear 1211. In other embodiments, the shaft sleeve 153 can be placed on the front gear 1211. The front supporter 151 connects to the shaft sleeve 153.

The automatic guided vehicle 10 can further comprise a back guiding portion 16. The back guiding portion 16 comprises a back supporter 161 and a back inductor 162. One end of the back supporter 161 connects to the back swerving shaft 122, and another end of the back supporter 161 connects to the back inductor 162. In this embodiment, a second back gear 1222 is installed and coupled to the back swerving shaft 122. The second back gear 1222 is placed on the first back gear 1221. In other embodiments, the second back gear 1222 can be placed under the first back gear 1221. The back guiding portion 16 can further comprise a guiding shaft 163 and a guiding gear 164. The guiding gear 164 is installed and coupled to the guiding shaft 163. The back supporter 161 connects to the guiding shaft 163. The guiding gear 164 engages with the second back gear 1222. In one embodiment, the automatic guided vehicle 10 can carry merchandise in a warehouse, for example.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An automatic guided vehicle comprising:
   a vehicle body comprising:
      two front wheels;
      a front wheel shaft connecting between the two front wheels;
      two back wheels; and
      a back wheel shaft connecting between the two back wheels;
   a swerving portion comprising:
      a front swerving shaft being installed at a center of the front wheel shaft, and a center axis of the front swerving shaft being perpendicular to the front wheel shaft, a front gear being installed and coupled to the front swerving shaft;
      a back swerving shaft being installed at a center of the back wheel shaft, a center axis of the back swerving shaft being perpendicular to the back wheel shaft, a first back gear being installed and coupled to the back swerving shaft;
      a swerving driver comprising a driving shaft, a driving gear being installed and entangling to the driving shaft; and
      a conveying belt being installed and entangling to the front gear, the first back gear and the driving gear, and the front gear, the first back gear and the driving gear abutting an inside surface of the conveying belt;
   a controlling portion driving the driving gear to rotate; and
   a driving portion being installed to the back wheel shaft and driving the back wheel shaft to rotate.

2. The automatic guided vehicle of claim 1, wherein the center axis of the front swerving shaft, the center axis of the back swerving shaft, and a center axis of the driving shaft are parallel to each other.

3. The automatic guided vehicle of claim 1, wherein the front gear, the first back gear and the driving gear are placed in one horizontal plane.

4. The automatic guided vehicle of claim 1, wherein a triangle is defined by three lines among the front gear, the first back gear and the driving gear, the front gear, the first back gear and the driving gear are placed in three corners of the triangle.

5. The automatic guided vehicle of claim 4, wherein the swerving portion further comprises two driven shafts and two driven gears being installed and coupled to the two driven shafts respectively.

6. The automatic guided vehicle of claim 5, wherein the two driven gear abut an outside surface of the conveying belt.

7. The automatic guided vehicle of claim 6, wherein the two driven gears are placed in the triangle defined by three lines among the front gear, the first back gear and the driving gear.

8. The automatic guided vehicle of claim 7, wherein one driven gear is placed in one side of the driving gear near the front gear, and another driven gear is placed in another side of the driving gear near the first back gear.

9. The automatic guided vehicle of claim 1 further comprises a front guiding portion, the front guiding portion comprises a front supporter and a front inductor, one end of the front supporter connects the front swerving shaft, and another end of the front supporter connects the front inductor.

10. The automatic guided vehicle of claim 9, wherein a shaft sleeve is installed and coupled to the front swerving shaft, the front supporter connects the shaft sleeve.

11. The automatic guided vehicle of claim 10, wherein the shaft sleeve is placed under the front gear or on the front gear.

12. The automatic guided vehicle of claim 1 further comprises a back guiding portion, wherein the back guiding portion comprises a back supporter and a back inductor, one end of the back supporter connects the back swerving shaft, and another end of the back supporter connects the back inductor.

13. The automatic guided vehicle of claim 12, wherein a second back gear is installed and coupled to the back swerving shaft.

14. The automatic guided vehicle of claim 13, wherein the second back gear is placed on the first back gear or under the first back gear.

15. The automatic guided vehicle of claim 13, wherein the back guiding portion further comprises a guiding shaft and a guiding gear, the guiding gear is installed and coupled to the guiding shaft, the back supporter connects the guiding shaft, the guiding gear engages with the second back gear.

\* \* \* \* \*